United States Patent
Meng et al.

(10) Patent No.: US 11,687,298 B2
(45) Date of Patent: Jun. 27, 2023

(54) NETWORK CONNECTION CONFIGURATION METHOD, NETWORK CONNECTION CONFIGURATION APPARATUS, IMAGE FORMING APPARATUS, AND STORAGE MEDIUM

(71) Applicant: Zhuhai Pantum Electronics Co., Ltd., Zhuhai (CN)

(72) Inventors: Lina Meng, Zhuhai (CN); Yinggui Chen, Zhuhai (CN); Han Yu, Zhuhai (CN); Xiang Chen, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 103 days.

(21) Appl. No.: 17/466,388

(22) Filed: Sep. 3, 2021

(65) Prior Publication Data

US 2021/0405942 A1 Dec. 30, 2021

Related U.S. Application Data

(63) Continuation-in-part of application No. PCT/CN2020/077496, filed on Mar. 2, 2020.

(30) Foreign Application Priority Data

Mar. 5, 2019 (CN) .......................... 201910165132.2

(51) Int. Cl.
*G06F 3/12* (2006.01)
*H04W 48/10* (2009.01)
*H04W 76/10* (2018.01)

(52) U.S. Cl.
CPC .......... *G06F 3/1236* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS

| | | |
|---|---|---|
| 2013/0100855 A1 | 4/2013 | Jung et al. |
| 2015/0146241 A1 | 5/2015 | Lee |
| 2018/0015755 A1 | 1/2018 | Yamada |

FOREIGN PATENT DOCUMENTS

| | | |
|---|---|---|
| CN | 102869014 A | 1/2013 |
| CN | 103716911 A | 4/2014 |

(Continued)

OTHER PUBLICATIONS

English translation of CN-104244245-A. (Year: 2014).*
(Continued)

*Primary Examiner* — Thomas D Lee
(74) *Attorney, Agent, or Firm* — Anova Law Group, PLLC

(57) ABSTRACT

The present disclosure provides a network connection configuration method, a network connection configuration apparatus, an image forming apparatus, and a storage medium. The method includes sending out a first SSID without a corresponding encryption key, such that an electronic device receiving the first SSID is capable of establishing a keyless communication connection with the image forming apparatus based on the first SSID; executing a preset operation which includes acquiring wireless network information sent by the electronic device which establishes the keyless communication connection with the image forming apparatus, and establishing a communication connection with a corresponding wireless network device based on the wireless network information; and sending out a second SSID with a corresponding encryption key, such that the electronic device which receives the second SSID is capable of estab-
(Continued)

lishing a key communication connection with the image forming apparatus based on the second SSID and the corresponding encryption key.

18 Claims, 6 Drawing Sheets

(52) U.S. Cl.
CPC .......... *G06F 3/1292* (2013.01); *H04W 48/10* (2013.01); *H04W 76/10* (2018.02)

(56) References Cited

FOREIGN PATENT DOCUMENTS

| | | | |
|---|---|---|---|
| CN | 104244245 A | * | 12/2014 |
| CN | 104301891 A | * | 1/2015 |
| CN | 105407450 A | | 3/2016 |
| CN | 105898830 A | | 8/2016 |
| CN | 106535301 A | | 3/2017 |
| CN | 107800916 A | | 3/2018 |
| EP | 2919446 A1 | | 9/2015 |

OTHER PUBLICATIONS

English translation of CN-104301891-A. (Year: 2015).*
The World Intellectual Property Organization (WIPO) International Search Report for PCT/CN2020/077496 dated May 27, 2020 5 Pages (including translation).

* cited by examiner

NETWORK CONNECTION CONFIGURATION METHOD, NETWORK CONNECTION CONFIGURATION APPARATUS, IMAGE FORMING APPARATUS, AND STORAGE MEDIUM

CROSS-REFERENCE TO RELATED APPLICATION

This application is a continuation-in-part application of PCT Patent Application No. PCT/CN2020/077496, filed on Mar. 2, 2020, which claims priority to Chinese patent application No. 201910165132.2, filed on Mar. 5, 2019, the entirety of all of which is incorporated herein by their reference.

TECHNICAL FIELD

The present disclosure generally relates to the field of wireless network configuration technology and, more particularly, relates to a network connection configuration method, a network connection configuration apparatus, an image forming apparatus, and a storage medium.

BACKGROUND

An image forming apparatus refers to an apparatus which prints data generated in an electronic device (e.g., a computer or the like) on record paper. In order to ensure that the image forming apparatus can obtain print data of more electronic devices, a wireless network connection may be normally established between the image forming apparatus and a wireless network device (e.g., a wireless router, a wireless access point, or the like).

The inventors of the present disclosure have found that in the existing technology, when establishing the connection between the image forming apparatus and the wireless network device, a user needs to manually connect the electronic device to a soft access point (soft AP) (e.g., entering a network name and a password of the soft AP, and the like) of the image forming apparatus; and connection information of the wireless network device (e.g., a service set identifier (SSID) and/or an encryption key of the wireless router) may be sent to the image forming apparatus, such that the image forming apparatus may establish a connection with the wireless network device according to the connection information. Therefore, for users who are not familiar with operations such as entering the network name and the encryption key of the soft AP, the image forming apparatus is extremely inconvenient to use with low user experience.

SUMMARY

The objective of the present disclosure is to provide a network connection configuration method, a network connection configuration apparatus, an image forming apparatus, and a storage medium, which may ensure that the image forming apparatus and a wireless network device establish a communication connection quickly and conveniently, and further ensure communication security between the image forming device and the electronic device.

To achieve the above-mentioned objective, the following technical solutions are used in embodiments of the present disclosure.

Embodiments of the present disclosure provide a network connection configuration method, applied to an image forming apparatus. The method includes:

sending out a first service set identifier (SSID) without a corresponding encryption key, such that an electronic device which receives the first SSID is capable of establishing a keyless communication connection with the image forming apparatus based on the first SSID;

executing a preset operation, where the preset operation includes acquiring wireless network information sent by the electronic device which establishes the keyless communication connection with the image forming apparatus, and establishing a communication connection with a corresponding wireless network device based on the wireless network information, wherein after establishing the communication connection with the corresponding wireless network device, the keyless communication connection with the electronic device is disconnected; and sending out a second SSID with a corresponding encryption key, such that the electronic device which receives the second SSID is capable of establishing a key communication connection with the image forming apparatus based on the second SSID and the corresponding encryption key.

In an optional embodiment of the present disclosure, in the above-mentioned network connection configuration method, the preset operation further includes:

starting timing after the first SSID is sent out; and stopping sending out the first SSID when a timing duration reaches a preset duration and the wireless network information is not received.

In an optional embodiment of the present disclosure, in the above-mentioned network connection configuration method, the preset operation further includes:

after the image forming apparatus establishes the keyless communication connection with the electronic device, determining whether the electronic device is an authorized electronic device; and if the electronic device is not the authorized electronic device, disconnecting the keyless communication connection established between the image forming apparatus and the electronic device, or stopping exchanging information with the electronic device, or not executing an instruction sent by the electronic device.

In an optional embodiment of the present disclosure, in the above-mentioned network connection configuration method, the preset operation further includes:

after the image forming apparatus establishes the keyless communication connection with the electronic device, determining whether an operation instruction sent by the electronic device is received; and if the operation instruction is received, discarding the operation instruction or not executing the operation instruction.

In an optional embodiment of the present disclosure, in the above-mentioned network connection configuration method, before sending out the first SSID without the corresponding encryption key, the method further includes:

establishing a communication connection with the electronic device by sending out the second SSID or via a USB interface, such that the electronic device is capable of sending a trigger instruction to the image forming apparatus, or generating a trigger instruction in response to a user operation through a control panel of the image forming apparatus; and acquiring the trigger instruction, such that the image forming apparatus is capable of sending out the first SSID without the corresponding encryption key based on the trigger instruction.

Embodiments of the present disclosure provide a network connection configuration apparatus, applied to an image forming apparatus. The apparatus includes a first SSID sending out module, a preset operation execution module, and a second SSID sending out module, where:

the first SSID sending out module is configured to send out a first service set identifier (SSID) without a corresponding encryption key, where an electronic device which receives the first SSID is capable of establishing a keyless communication connection with the image forming apparatus based on the first SSID;

the preset operation execution module is configured to execute a preset operation, where the preset operation includes acquiring wireless network information sent by the electronic device which establishes the keyless communication connection with the image forming apparatus, and establishing a communication connection with a corresponding wireless network device based on the wireless network information, wherein after establishing the communication connection with the corresponding wireless network device, the keyless communication connection with the electronic device is disconnected; and the second SSID sending out module is configured to send out a second SSID with a corresponding encryption key, where the electronic device which receives the second SSID is capable of establishing a key communication connection with the image forming apparatus based on the second SSID and the corresponding encryption key.

In an optional embodiment of the present disclosure, in the above-mentioned network connection configuration apparatus, the preset operation execution module includes a timing processing sub-module and an output stopping sub-module, where:

the timing processing sub-module is configured to start timing after the first SSID is sent out; and the output stopping sub-module is configured to stop sending out the first SSID when a timing duration reaches a preset duration and the wireless network information is not received.

In an optional embodiment of the present disclosure, in the above-mentioned network connection configuration apparatus, the preset operation execution module includes a verification and determination sub-module and a first processing sub-module, where:

the verification and determination sub-module is configured to, after the image forming apparatus establishes the keyless communication connection with the electronic device, determine whether the electronic device is an authorized electronic device; and the first processing sub-module is configured to, when the electronic device is not the authorized electronic device, disconnect the keyless communication connection established between the image forming apparatus and the electronic device, or stop exchanging information with the electronic device, or not execute an instruction sent by the electronic device.

In an optional embodiment of the present disclosure, in the above-mentioned network connection configuration apparatus, the preset operation execution module includes an operation instruction determination sub-module and a second processing sub-module, where:

the operation instruction determination sub-module is configured to, after the image forming apparatus establishes the keyless communication connection with the electronic device, determine whether an operation instruction sent by the electronic device is received; and the second processing sub-module is configured to, when the operation instruction is received, discard the operation instruction or not execute the operation instruction.

In an optional embodiment of the present disclosure, in the above-mentioned network connection configuration apparatus, the apparatus further includes a trigger instruction acquisition module, a communication connection establishing module and/or a trigger instruction generation module, where:

the trigger instruction acquisition module is configured to establish a communication connection with the electronic device by sending out the second SSID or via a USB interface, where the electronic device is capable of sending a trigger instruction to the image forming apparatus;

the communication connection establishing module is configured to generate a trigger instruction in response to a user operation through a control panel of the image forming apparatus; and the trigger instruction generation module is configured to acquire the trigger instruction, where the image forming apparatus is capable of sending out the first SSID without the corresponding encryption key based on the trigger instruction.

According to the above-mentioned basis, embodiments of the present disclosure further provide an image forming apparatus, including a memory, a processor, and the above-mentioned network connection configuration apparatus. The network connection configuration apparatus includes one or more software function modules stored in the memory and executed by the processor.

According to the above-mentioned basis, embodiments of the present disclosure further provide a computer-readable storage medium on which computer programs are stored, and the computer programs implement the above-mentioned network connection configuration method when the computer programs are executed.

In the network connection configuration method, the network connection configuration apparatus, the image forming apparatus, and a storage medium provided in various embodiments of the present disclosure, the electronic device may establish the keyless communication connection with the image forming apparatus through sending out the first SSID without a corresponding encryption key, which may ensure that the image forming apparatus and the electronic device are connected quickly and conveniently to receive wireless network information and establish the communication connection with the wireless network device, thereby avoiding the poor experience problem due to the need for the user to perform corresponding connection operations in the existing technology; furthermore, after the image forming apparatus establishes the communication connection with the wireless network device, the second SSID with the corresponding encryption key may be sent out to replace the first SSID, such that the electronic device and the image forming apparatus establish the key communication connection to ensure the security of the communication connection between the image forming apparatus and the electronic device, which has extremely high practicability.

In order to make the above-mentioned objectives, features and advantages of the present disclosure more obvious and understandable, the optional embodiments and accompanying drawings are described in detail hereinafter.

DETAILED DESCRIPTION

Figure 1:
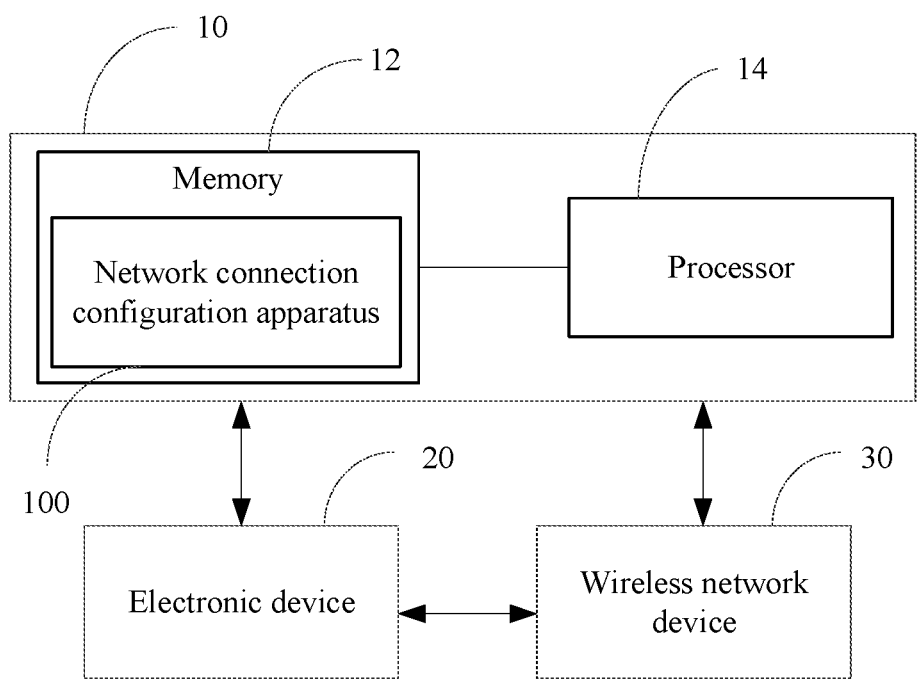
FIG. 1 illustrates an application block diagram of an image forming apparatus according to various exemplary embodiments of the present disclosure.

In order to illustrate objectives, technical solutions and advantages of embodiments of the present disclosure more clearly, the technical solutions in embodiments of the present disclosure may be clearly and completely described with reference to the drawings in embodiments of the present disclosure hereinafter. Obviously, described embodiments may be a part of embodiments, rather than all of embodiments, of the present disclosure. The components in embodiments of the present disclosure described and shown in the drawings herein may be arranged and designed in various different configurations.

Therefore, the following detailed description of embodiments of the present disclosure provided in the drawings may not be intended to limit the scope of the claimed invention, but may merely represent optional embodiments of the present disclosure. Based on embodiments of the present disclosure, all other embodiments obtained by those skilled in the art without creative work shall fall within the protection scope of the present disclosure.

It should be noted that similar reference numerals and letters indicate similar items in the following drawings. Therefore, once a certain item is defined in one drawing, it does not need to be further defined and explained in the subsequent drawings. In the description of the present disclosure, the terms "first", "second", "third", "fourth" and the like may merely be used to distinguish the description, and may not be understood as merely or implying relative importance.

In the description of the present disclosure, unless expressly stipulated and limited otherwise, the terms "configuration", "connection", and "join" should be interpreted in a broad sense. For example, "connection" can be a fixed connection, a detachable connection, or an integral connection; can be a mechanical connection or an electrical connection; can be a direct connection, or an indirect connection through an intermediate medium; and can also be the internal communication between two components. For those skilled in the art, the specific meaning of the above-mentioned terms in the present disclosure may be understood under specific circumstances.

As shown in FIG. 1, embodiments of the present disclosure provide an image forming apparatus. The image forming apparatus 10 may include a memory 12, a processor 14 and a network connection configuration apparatus 100.

The memory 12 and the processor 14 may be, directly or indirectly, electrically connected to implement data transmission or exchange. For example, the memory 12 and the processor 14 may be electrically connected to each other through one or more communication buses or signal lines. The network connection configuration apparatus 100 may include at least one software function module which can be stored in the memory 12 in the form of software or firmware. The processor 14 may be configured to execute executable computer programs stored in the memory 12, including the software function module, the computer programs and the like included in the network connection configuration apparatus 100, thereby implementing a network connection configuration method.

The memory 12 may be, but may not be limited to, a random-access memory (RAM), a read-only memory (ROM), a programmable read-only memory (PROM), an erasable programmable read-only memory (EPROM), an electric erasable programmable read-only memory (EEPROM), and/or the like. The memory 12 may be configured to store programs, and the processor 14 may be configured to execute the programs after receiving execution instructions.

The processor 14 may be an integrated circuit chip with signal processing capability. The above-mentioned processor 14 may be a general-purpose processor, including a central processing unit (CPU), a network processor (NP), a system on chip (SoC) and/or the like; and may also be a digital signal processor (DSP), an application specific integrated circuit (ASIC), a field programmable gate array (FPGA), a programmable logic device, a discrete gate or transistor logic device, or a discrete hardware component. Various methods, steps, and logical block diagrams disclosed in embodiments of the present disclosure may be implemented or executed by the processor. The general-purpose processor may be a microprocessor, or the processor may also be any conventional processor and/or the like.

Figure 2:
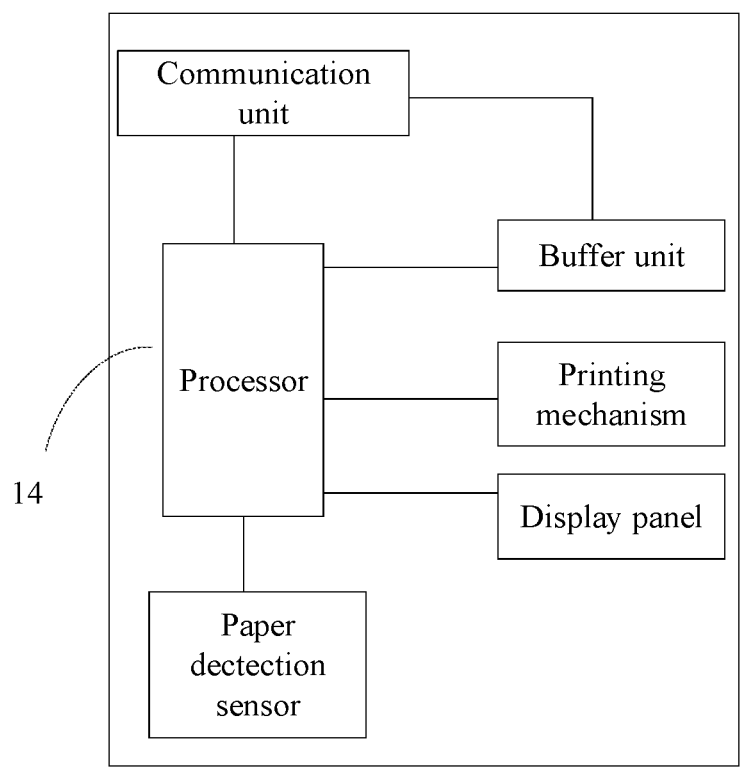
FIG. 2 illustrates a schematic block diagram of an image forming apparatus according to various exemplary embodiments of the present disclosure.

It should be understood that the structure shown in FIG. 1 is merely exemplary, and the image forming apparatus 10 may also include more or less components than those shown in FIG. 1, or have a configuration different from that shown in FIG. 1. For example, as shown in FIG. 2, the image forming apparatus 10 may further include a display panel, a communication unit, a cache unit (also called a memory, such as DDR3 or DDR4), a printing mechanism, a sensor, and the like. In addition, each component shown in FIG. 1 and FIG. 2 may be implemented by hardware, software, or a combination thereof.

It should be noted that the types of the image forming apparatuses 10 may not be limited according to embodiments of the present disclosure. For example, the image forming apparatuses 10 may be divided according to functions. The image forming apparatuses 10 may include, but may not be limited to, a printer, a copier, a fax machine, a scanner, and an all-in-one machine which integrate printing, copying, faxing, scanning and other functions.

For another example, according to different image forming principles of the image forming apparatuses 10, the image forming apparatuses 10 may include, but may not be limited to, an inkjet printer, a laser printer, an LED printer, and/or the like.

Figure 3:
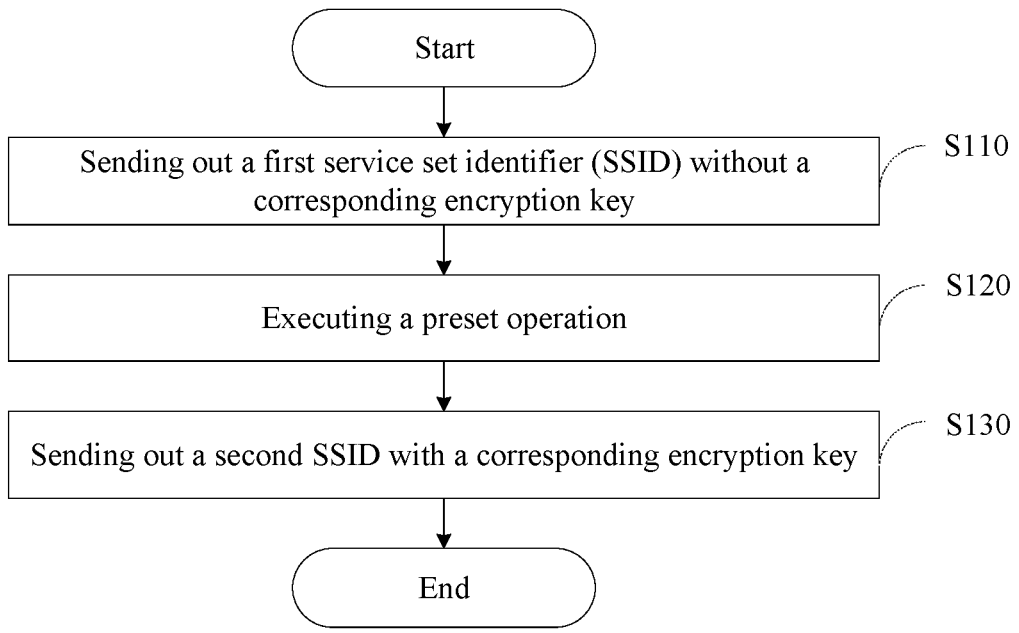
FIG. 3 illustrates a schematic flowchart of a network connection configuration method according to various exemplary embodiments of the present disclosure.

Referring to FIG. 3, embodiments of the present disclosure also provide a network connection configuration method applicable to the above-mentioned image forming apparatus 10, where the method steps defined in the process related to the network connection configuration method may be implemented by the image forming apparatus 10. The process shown in FIG. 3 is described in detail hereinafter.

In S110, the first SSID without a corresponding encryption key may be sent out.

In one embodiment, the image forming apparatus 10 may send out the first SSID without the corresponding encryption key, such that the electronic device 20 which receives the first SSID may establish a keyless communication connection with the image forming apparatus 10 based on the first SSID. In other words, at a terminal of the electronic device 20, the communication connection with the image forming apparatus 10 may be implemented without inputting an encryption key by the user.

It should be noted that the image forming apparatus 10 may send out the first SSID when receiving a trigger instruction. In other words, the operation of sending out the first SSID may be configured with a corresponding trigger mechanism.

The manner or device for generating the trigger instruction may not be limited according to embodiments of the present disclosure, and may be selected according to actual application requirements. For example, in an optional embodiment, the trigger instruction may be an instruction sent by the electronic device 20 communicatively connected with the image forming apparatus 10.

For another example, in another optional embodiment, if the image forming apparatus 10 has a control panel, a corresponding turn-on button may be configured on the control panel to generate the trigger instruction when the user presses the button. Or, the turn-on button may be reused with other buttons inherent in the control panel of the image forming apparatus 10. For example, the control panel of the image forming apparatus 10 may be disposed with a Wi-Fi button; and the Wi-Fi button may be configured to turn on a soft AP working mode when the Wi-Fi button is pressed for a short time (e.g., less than 1 s), and turn on a network configuration mode when the Wi-Fi button is pressed for a long time (e.g., greater than 1 s). In addition, when the network configuration mode is turned on, the soft AP of the image forming apparatus 10 may send out the first SSID, such that the electronic device 20 which receives the first SSID may be quickly connected with the image forming apparatus 10 without requiring an encryption key. When the user triggers the image forming apparatus 10 to send out the first SSID using the control panel of the image forming apparatus 10, the electronic device 20 may quickly establish the keyless communication connection with the image forming apparatus 10; and the image forming apparatus 10 may establish a connection with the wireless network device 30 after receiving the wireless network information from the electronic device 20. Compared with the existing technology that operations, such as entering a network name or a password, are required to establish the connection between the electronic device 20 and the image forming apparatus 10, the solutions provided by embodiments of the present disclosure may reduce the user's operation steps and implement one-key (or one-click) configuration of the network connection to the image forming apparatus 10. That is, the user may only need to turn on the network configuration mode of the image forming apparatus 10 with one key (or one click), such that the electronic device 20 may be connected to the image forming apparatus 10 without an encryption key, and may send the wireless network information to the image forming apparatus 10.

For example, before executing S110, in order to ensure that the electronic device 20 can send the trigger instruction to the image forming apparatus 10, the image forming apparatus 10 may establish the communication connection with the electronic device 20 via sending out the second SSID, or via a USB interface, a wired network, or other wireless connection manners (e.g., Bluetooth, infrared, NFC and/or the like), such that the electronic device 20 may send the trigger instruction to the image forming apparatus 10. The electronic device 20 may send the trigger instruction based on a driver installed on an operating system, or the electronic device 20 may generate the trigger instruction in response to a user operation.

For example, when after sending out the second SSID, the user may want to reconfigure the network of the image forming apparatus 10, the user can operate a reservation button on the panel of the image forming apparatus 10 for sending out the first SSID that can easily connect to the image forming apparatus 10 for fast reconfiguring the network.

In the process of installing the driver on the electronic device 20, the image forming apparatus 10 needs to establish the communication connection with the electronic device 20 via sending out the second SSID, or via a USB interface, other wired cables or wired networks, or other wireless connection manners. Therefore, the trigger instruction may be sent to the image forming apparatus 10, through the installed driver, directly based on the communication connection. In such way, it may solve the problem that the process of establishing the communication connection between the image forming apparatus 10 and the wireless network device 30 is complicated due to the need for the user to operate the control panel of the image forming apparatus 10 to generate the trigger instruction, thereby effectively improving user experience.

It should be noted that when the image forming apparatus 10 communicates with the electronic device 20 by sending out the second SSID, the communication connection may be a key communication connection. That is, a terminal of the electronic device 20 may need to establish the communication connection with the image forming apparatus 10 based on the second SSID and the corresponding encryption key.

Through the above-mentioned step, the electronic device 20 may quickly and conveniently establish the communication connection with the image forming apparatus 10 to send the wireless network information to the image forming apparatus 10. The wireless network information may include the SSID and the encryption key corresponding to the wireless network device 30.

It should be noted that the wireless network device 30 may include, but may not be limited to, a wireless access point (AP), or a wireless router. The wireless network information may be saved by the operating system of the electronic device 20. The wireless network information may be, for example, the information of the wireless network device 30 to which the image forming apparatus 10 or the electronic device 20 has been connected or last connected. Or, the wireless network information may be the information generated based on user operations.

In S120, a preset operation may be executed.

In S120, the electronic device 20, which establishes the keyless communication connection with the image forming apparatus 10 based on the first SSID, may send the wireless network information to the image forming apparatus 10. After receiving the wireless network information, the image forming apparatus 10 may establish the communication connection with a corresponding wireless network device 30 based on the wireless network information, thereby completing quick network connection configuration of the image forming apparatus 10.

In S130, the second SSID with a corresponding encryption key may be sent out.

In one embodiment, after the communication connection between the image forming apparatus 10 and the wireless network device 30 is completed through S120, the image forming apparatus 10 may send out the second SSID with the corresponding encryption key, such that the electronic device 20, which receives the second SSID, may establish a key communication connection with the image forming apparatus 10 based on the second SSID and the corresponding encryption key.

In other words, after the image forming apparatus 10 establishes the communication connection with the wireless network device 30, the image forming apparatus 10 may stop sending out the first SSID and disconnect the keyless communication connection with the electronic device 20, and may send out the second SSID. Therefore, it may avoid the problem that other electronic devices establish communication connection with the image forming apparatus 10 based on the first SSID which may result in the decrease of the communication security. When the image forming apparatus 10 establishes the communication connection with the wireless network device 30, the keyless communication connection with the electronic device 20 may be disconnected. For example, when the image forming apparatus 10 establishes the communication connection with the wireless network device 30, the image forming apparatus 10 may send information of a successful connection to the electronic device 20 via the keyless communication connection, and the electronic device 20 may disconnect the keyless communication connection and restore an original network connection. Or, when after the image forming apparatus 10 establishes the communication connection with the wireless network device 30, the image forming apparatus 10 may stop sending out the first SSID so the keyless communication connection with the electronic device 20 may be disconnected. Or, when the image forming apparatus 10 establishes the communication connection with the wireless network device 30, the image forming apparatus 10 may disconnect the keyless communication connection with the electronic device 20 and stop sending the first SSID after a predetermined time, and subsequently send out the second SSID.

The turn-on mechanism for the image forming apparatus 10 to send out the second SSID may not be limited according to embodiments of the present disclosure, and may be selected according to actual application requirements. For example, in an optional embodiment, the image forming apparatus 10 may detect in real time whether the image forming apparatus 10 establishes the communication connection with the wireless network device 30, and send out the second SSID when the image forming apparatus 10 is detected to establish the communication connection with the wireless network device 30.

For another example, in another optional embodiment, after the electronic device 20 sends the wireless network information to the image forming apparatus 10, the electronic device 20 may send an instruction to the image forming apparatus 10 after a certain duration, such that the image forming apparatus 10 may sent out the second SSID based on the instruction. Or, the electronic device 20 may also perform a real-time query on the network status of the image forming apparatus 10 after sending the wireless network information to the image forming apparatus 10, and may send an instruction to the image forming apparatus 10 when it is inquired that the image forming apparatus 10 establishes the communication connection with the wireless network device 30, such that the image forming apparatus 10 may send out the second SSID based on the instruction.

It should be noted that, in one embodiment, the communication unit of the image forming apparatus 10 may include the first communication unit and the second communication unit. The first communication unit may be configured to send out the first SSID and the second SSID, such that the image forming apparatus 10 may work in the soft AP mode based on the first SSID and the second SSID to implement a point-to-point connection with the electronic device 20. The second communication unit may be configured to establish the communication connection with the wireless network device 30 through acquired wireless network information, such that the image forming apparatus 10 may work in a station mode (or work-at-station mode).

Furthermore, the soft AP mode and the station mode of the image forming apparatus 10 may be configured accordingly in advance. For example, in an optional embodiment, the image forming apparatus 10 may work in the soft AP mode and the station mode simultaneously.

For another example, in another optional embodiment, the image forming apparatus 10 may only work in the soft AP mode or the station mode at a same moment. For example, as long as the image forming apparatus 10 is connected to the wireless network device 30 and works in the station mode, the image forming apparatus 10 may stop sending out the first SSID and the second SSID.

Figure 4:
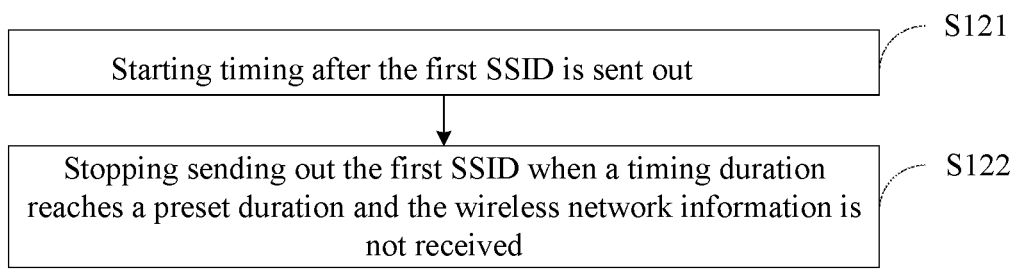
FIG. 4 illustrates a schematic flowchart of sub-steps included in S120 of FIG. 3.

Optionally, executing S120 to complete the preset operation may not be limited according to embodiments of the present disclosure. Based on the above-mentioned description and in conjunction with FIG. 4, S120 may include S121 and S122 which are described in detail hereinafter.

In S121, timing may be started after the first SSID is sent out.

In S122, sending out the first SSID may be stopped when the timing duration reaches a preset duration and the wireless network information is not received.

In one embodiment, in order to avoid the problem that sending the first SSID for a long period of time results in other electronic devices to be easily establish the communication connection with the image forming apparatus 10 based on the first SSID which leads to low connectivity security, timing may be started after the first SSID is sent out, and sending out the first SSID may stopped when the timing duration reaches the preset duration and the wireless network information is not received.

In addition, after the image forming apparatus 10 stops sending out the first SSID, in order to ensure that other electronic devices can also establish the communication connection with the image forming apparatus 10, S130 may be executed to send out the second SSID to establish the corresponding encryption key communication connection.

The value of the preset duration may not be limited according to embodiments of the present disclosure, and may be selected according to actual application requirements. For example, the value of the preset duration may include, but may not be limited to, 1 min, 5 min, 10 min, and the like.

It should be noted that, in order to ensure that the electronic device 20 can establish the communication connection with the image forming apparatus 10 through the first SSID timely and send the wireless network information to the image forming apparatus 10 timely, which may avoid the problem that the communication connection with the wireless network device 30 fails to be established due to the first SSID being stopped sending out after reaching the preset duration, the first SSID may also be configured accordingly (e.g., a preset character or number is configured in the first SSID) in one embodiment. Therefore, the electronic device 20 may effectively identify the first SSID; and after identifying the first SSID, the electronic device 20 may immediately establish the keyless communication connection with the image forming apparatus 10 and immediately send the wireless network information to the image forming apparatus 10.

Figure 5:
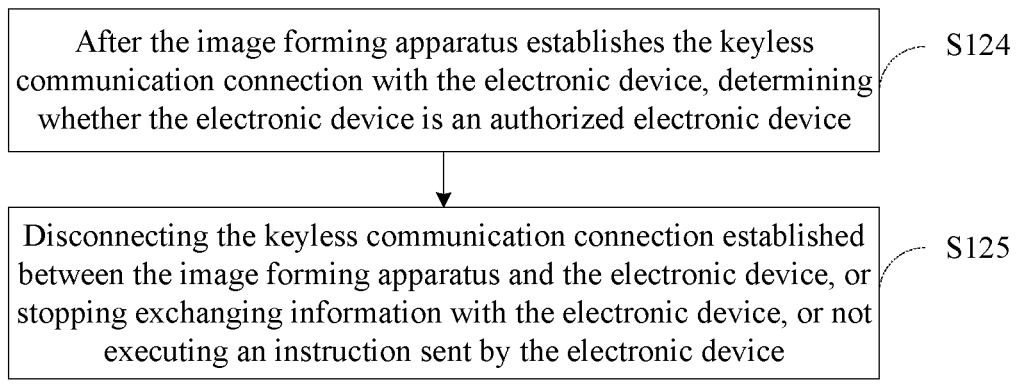
FIG. 5 illustrates a schematic flowchart of other sub-steps included in S120 of FIG. 3.

Furthermore, in order to improve the security of the communication between the electronic device 20 and the image forming apparatus 10 and prevent other electronic devices from arbitrarily operating the image forming apparatus 10, the preset operation may further include a security verification operation. For example, referring to FIG. 5, in one embodiment, S120 may further include S124 and S125 which are described in detail hereinafter.

In S124, after the image forming apparatus 10 establishes the keyless communication connection with the electronic device 20, whether the electronic device 20 is an authorized electronic device may be determined.

In S124, after the image forming apparatus 10 establishes the keyless communication connection with the electronic device 20, the manner of determining whether the electronic device 20 is an authorized electronic device may be determining whether verification information sent by the electronic device 20 is received. For example, when the verification information sent by the electronic device 20 is not received (i.e., the electronic device 20 is not an authorized electronic device), S125 may be executed.

If the trigger instruction is sent by the electronic device 20, the verification information and the trigger instruction may be sent as a data packet through the electronic device 20, or the verification information may be separately sent through a data packet different from that of the trigger instruction.

Furthermore, the content of the verification information may not be limited according to embodiments of the present disclosure, and may be selected according to actual application requirements. For example, the verification information may include, but may not be limited to, one or a combination of the serial number of the driver installed on the electronic device 20, the device information (e.g., device name) of the electronic device 20, and a security code. The security code may be randomly generated or preset.

It should be noted that in the above-mentioned description of "one or a combination", "combination" may refer to two or more components.

In addition, for example, determining whether the electronic device 20 is an authorized electronic device may also be determined based on that the image forming apparatus 10 actively inquires the electronic device 20 to obtain the verification information such as the device information of the electronic device 20, or the serial number, or security code of the driver, and/or the like. If the verification information returned by the electronic device 20 is not verified by the image forming apparatus 10, the image forming apparatus 10 may determine that the electronic device 20 is not an authorized electronic device, and S125 may be executed.

In S125, the keyless communication connection established between the image forming apparatus 10 and the electronic device 20 may be disconnected, or exchanging information with the electronic device 20 may be stopped, or the instruction sent by the electronic device 20 may not be executed.

In one embodiment, when it is determined, through S124, that the verification information sent by the electronic device 20 is not received or the image forming apparatus 10 does not approve the verification information sent by the electronic device 20, the security of the electronic device 20 may be determined to be low. Therefore, it may choose to disconnect the keyless communication connection established with the electronic device 20, or not respond to the instruction sent by the electronic device 20, or not perform further information exchange with the electronic device 20.

It should be noted that the instruction refers to any instruction sent by the electronic device 20, for example, may be a query instruction to read the status information of the image forming apparatus 10. Through S125, it can be ensured that only the electronic device 20 that has passed the verification may further send wireless network information to the image forming apparatus 10, and then configure the network connection of the image forming apparatus 10, which may prevent the problem that electronic devices, which have not passed the security verification, randomly send wireless network information to the image forming apparatus 10, resulting in the image forming apparatus 10 to arbitrarily switch connected wireless routers.

Figure 6:
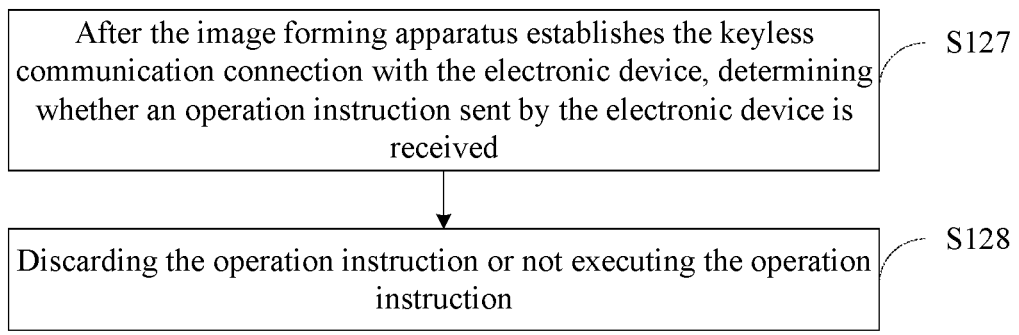
FIG. 6 illustrates a schematic flowchart of other sub-steps included in S120 of FIG. 3.

In order to further improve the security of the communication between the image forming apparatus 10 and the electronic device 20 and prevent the electronic device 20 from arbitrarily operating the image forming apparatus 10 in the configuration network of the image forming apparatus 10, referring to FIG. 6, S120 may further include S127 and S128 in one embodiment which are described in detail hereinafter.

In S127, after the image forming apparatus 10 establishes the keyless communication connection with the electronic device 20, whether an operation instruction sent by the electronic device 20 is received may be determined.

In one embodiment, after the image forming apparatus 10 establishes the keyless communication connection with the electronic device 20, it may be determined whether the operation instruction sent by the electronic device 20 (e.g., other instructions not related to the wireless network information) is received; and if the operation instruction sent by the electronic device 20 is received, S128 may be executed.

In S128, the operation instruction may be discarded or the operation instruction may not be executed.

In one embodiment, when it is determined through S128 that the operation instruction sent by the electronic device 20 is received, the operation instruction may be directly discarded or the operation instruction may not be executed.

In other words, among various instructions or information sent by the electronic device 20 which establishes the keyless communication connection with the image forming apparatus 10 based on the first SSID, the image forming apparatus 10 may receive the wireless network information to configure the network connection (i.e., when the image forming apparatus 10 establishes the keyless communication connection with the electronic device 20, only network configuration may be performed), and other operation instructions (e.g., query instructions) may not be executed, thereby ensuring the security of the image forming apparatus 10.

In one embodiment, the electronic device 20, which establishes the keyless communication connection with the image forming apparatus 10 based on the first SSID, may be restricted to using partial functions of the image forming apparatus 10. For example, the electronic device 20 may be able to instruct the image forming apparatus 10 to print test pages, and/or query the status of the image forming device 10 via the keyless communication connection; but may not be able to, via the keyless communication connection, send image data to the image forming apparatus 10 to perform printing, and/or instruct the image forming apparatus 10 to scan images and transmit the scanned images to the electronic device 20. As such, the security of the image forming apparatus 10 can be ensured, and arbitrary use of the first SSID for printing jobs or scanning images via the keyless communication connection may be prevented. Such limited use can urge users to configure the network of the image forming apparatus 10 and to use the image forming apparatus 10 in a normal way.

Figure 7:
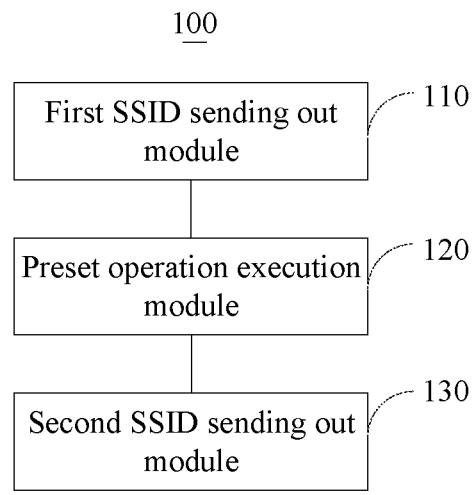
FIG. 7 illustrates a schematic block diagram of functional modules included in a network connection configuration apparatus according to various exemplary embodiments of the present disclosure.

Referring to FIG. 7, embodiments of the present disclosure also provide a network connection configuration apparatus 100 which can be applied to the above-mentioned image forming apparatus 10. The network connection configuration apparatus 100 may include a first SSID sending out module 110, a preset operation execution module 120, and a second SSID sending out module 130.

The first SSID sending out module 110 may be configured to send out the first SSID without the corresponding encryption key, such that the electronic device 20 which receives the first SSID may establish the keyless communication connection with the image forming apparatus 10 based on the first SSID. In one embodiment, the first SSID sending out module 110 may be configured to execute S110 shown in FIG. 3, and related content of the first SSID sending out module 110 may refer to the above-mentioned description of S110.

The preset operation execution module 120 may be configured to execute the preset operation. The preset operation may include acquiring the wireless network information sent by the electronic device 20 which establishes the keyless communication connection with the image forming apparatus 10, and establishing the communication connection with the corresponding wireless network device 30 based on the wireless network information. In one embodiment, the preset operation execution module 120 may be configured to execute S120 shown in FIG. 3, and related content of the preset operation execution module 120 may refer to the above-mentioned description of S120.

The second SSID sending out module 130 may be configured to send out the second SSID with the corresponding encryption key, such that the electronic device 20, which receives the second SSID, may establish the key communication connection with the image forming apparatus 10 based on the second SSID and the corresponding encryption key. When the second SSID is sent out, the image forming apparatus 10 may disconnect the keyless communication connection with the electronic device 20. In one embodiment, the second SSID sending out module 130 may be configured to execute S130 shown in FIG. 3, and related content of the second SSID sending out module 130 may refer to the above-mentioned description of S130.

Figure 8:
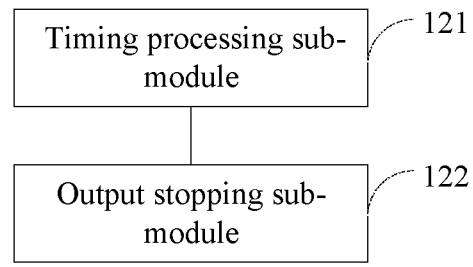
FIG. 8 illustrates a schematic block diagram of functional modules included in a preset operation execution module according to various exemplary embodiments of the present disclosure.

Referring to FIG. 8, in one embodiment, the preset operation execution module 120 may include a timing processing sub-module 121 and an output stopping sub-module 122.

The timing processing sub-module 121 may be configured to start timing after sending out the first SSID. In one embodiment, the timing processing sub-module 121 may be used to execute S121 shown in FIG. 4, and related content of the timing processing sub-module 121 may refer to the above-mentioned description of S121.

The output stopping sub-module 122 may be configured to stop sending out the first SSID when the timing duration reaches the preset duration and the wireless network information is not received. In one embodiment, the output stopping sub-module 122 may be configured to execute S122 shown in FIG. 4, and related content of the output stopping sub-module 122 may refer to the above-mentioned description of S122.

Figure 9:
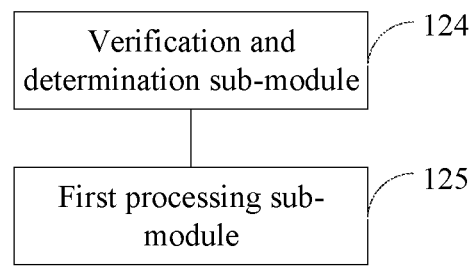
FIG. 9 illustrates a schematic block diagram of other functional modules included in a preset operation execution module according to various exemplary embodiments of the present disclosure.

Referring to FIG. 9, in one embodiment, the preset operation execution module 120 may further include a verification and determination sub-module 124 and a first processing sub-module 125.

The verification and determination sub-module 124 may be configured to determine whether the electronic device 20 is an authorized electronic device after the image forming apparatus 10 and the electronic device 20 establish the keyless communication connection. In one embodiment, the verification and determination sub-module 124 may be configured to execute S124 shown in FIG. 5, and related content of the verification and determination sub-module 124 may refer to the above-mentioned description of S124.

The first processing sub-module 125 may be configured to disconnect the keyless communication connection established between the image forming apparatus 10 and the electronic device 20 when the electronic device 20 is not an authorized electronic device, or stop exchanging information with the electronic device 20, or not execute the instruction sent by the electronic device 20. In one embodiment, the first processing sub-module 125 may be configured to execute S125 shown in FIG. 5, and related content of the first processing sub-module 125 may refer to the above-mentioned description of S125.

Figure 10:
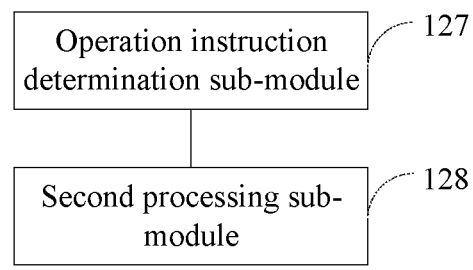
FIG. 10 illustrates another schematic block diagram of other functional modules included in a preset operation execution module according to various exemplary embodiments of the present disclosure.

Referring to FIG. 10, in one embodiment, the preset operation execution module 120 may further include an operation instruction determination sub-module 127 and a second processing sub-module 128.

The operation instruction determination sub-module 127 may be configured to determine whether an operation instruction sent by the electronic device 20 is received after the image forming apparatus 10 and the electronic device 20 establish the keyless communication connection. In one embodiment, the operation instruction determination sub-module 127 may be configured to execute S127 shown in FIG. 6, and related content of the operation instruction determination sub-module 127 may refer to the above-mentioned description of S127.

The second processing sub-module 128 may be configured to discard the operation instruction or not execute the operation instruction when the operation instruction is received. In one embodiment, the second processing sub-module 128 may be configured to execute S128 shown in FIG. 6, and related content of the second processing sub-module 128 may refer to the above-mentioned description of S128.

Furthermore, in one embodiment, the network connection configuration apparatus 100 may further include a trigger instruction acquisition module, a communication connection establishing module, and/or a trigger instruction generation module.

The communication connection establishing module may be configured to establish the communication connection with the electronic device 20 via sending out the second SSID, or via a USB interface, a wired network interface, or other wireless connection manners, such that the electronic device 20 may send the trigger instruction to the image forming apparatus 10. The trigger instruction generating module may be configured to generate the trigger instruction in response to a user operation through the control panel of the image forming apparatus 10. The trigger instruction acquisition module may be configured to acquire the trigger instruction, such that the image forming apparatus 10 may send out the first SSID without the corresponding encryption key based on the trigger instruction.

In embodiments of the present disclosure, corresponding to the network connection configuration method shown in FIGS. 3-6, a computer-readable storage medium may also be provided. Computer programs may be stored in the computer-readable storage medium, and each step of the above-mentioned network connection configuration method may be performed when executing the computer programs.

Performing each step when executing the computer programs may not be described in detail herein, and reference may be made to the previous description of the network connection configuration method.

As disclosed, in the network connection configuration method, the network connection configuration apparatus 100, the image forming apparatus 10, and the storage medium provided by the present disclosure, the electronic device 20 may establish the keyless communication connection with the image forming apparatus 10 through sending out the first SSID without the corresponding encryption key, which ensures that the image forming apparatus 10 may be connected to the electronic device 20 quickly and conveniently to receive the wireless network information and establish the communication connection with the wireless network device 30, thereby avoiding the poor experience problem in the existing technology due to the need for the user to perform corresponding connection operations. In addition, after the image forming apparatus 10 establishes the communication connection with the wireless network device 30, the second SSID with the corresponding encryption key may be sent out to replace the first SSID, such that the electronic device 20 and the image forming apparatus 10 establish the key communication connection to ensure the security of the communication connection between the image forming apparatus 10 and the electronic device 20, which may have extremely high practicability.

In multiple embodiments provided in the present disclosure, it should be understood that the disclosed device and method may also be implemented through other manners. The device and method embodiments described above may merely be exemplary. For example, flowcharts and block diagrams in the drawings may show possible implementation architectures, functions, and operations of the devices, methods, and computer program products according to multiple embodiments of the present disclosure. Each block in the flowcharts or block diagrams may represent a module, a program segment, or a part of the code; and the module, the program segment or the part of the code may contain one or more executable instructions for implementing specified logic functions. It should also be noted that in some optional implementations, the functions marked in the blocks may also occur in a different order from the order marked in the drawings. For example, two consecutive blocks may actually be executed substantially in parallel, or may sometimes be executed in a reverse order, depending on the functions involved. It should also be noted that each block in the block diagrams and/or flowcharts and the combination of the blocks in the block diagrams and/or flowcharts may be implemented by a dedicated hardware-based system that performs the specified functions or actions, or may be implemented by a combination of dedicated hardware and computer instructions.

Furthermore, functional modules in the various embodiments of the present disclosure may be integrated together to form an independent part, or each module may exist separately, or two or more modules may be integrated to form an independent part.

If the function is implemented in the form of a software function module and sold or used as an independent product, it can be stored in a computer readable storage medium. Based on such understanding, the technical solutions of the present disclosure, or the part that contributes to the existing technology, or the part of the technical solutions may be essentially embodied in the form of a software product. The computer software product may be stored in a storage medium and include several instructions to make a computer device (e.g., a personal computer, an electronic device, a network device, or the like) execute all or part of the steps of the methods described in various embodiments of the present disclosure. The above-mentioned storage media may include various media that can store program codes, including a U disk, a mobile hard disk, a read-only memory (ROM), a random-access memory (RAM), a magnetic disk, an optical disk, and/or the like. It should be noted that in the present disclosure, the terms "include", "contain" or any other variants thereof may be intended to cover non-exclusive inclusion, such that a process, method, article, or device which include a series of elements may include not only those elements, but also include other elements that are not explicitly listed, or also include elements inherent to the process, method, article, or device. If there are no more restrictions, the element defined by the sentence "include a . . . " may not exclude the existence of other identical elements in the process, method, article, or device that include such element.

The above-mentioned descriptions may merely be optional embodiments of the present disclosure, and may not be intended to limit the present disclosure. For those skilled in the art, the application may have various modifications and changes. Any modification, equivalent replacement, improvement and the like made within the spirit and principle of the present disclosure shall be included in the protection scope of the present disclosure.

What is claimed is:

1. A network connection configuration method, applied to an image forming apparatus, comprising:
sending out a first service set identifier (SSID) without a corresponding encryption key, such that an electronic device which receives the first SSID is capable of establishing a keyless communication connection with the image forming apparatus based on the first SSID;
executing a preset operation, wherein the preset operation includes acquiring wireless network information sent by the electronic device which establishes the keyless communication connection with the image forming apparatus, and establishing a communication connection with a corresponding wireless network device based on the wireless network information, wherein after establishing the communication connection with the corresponding wireless network device, the keyless communication connection with the electronic device is disconnected; and
sending out a second SSID with a corresponding encryption key, such that the electronic device which receives the second SSID is capable of establishing a key communication connection with the image forming apparatus based on the second SSID and the corresponding encryption key.

2. The method according to claim 1, wherein the preset operation further includes:
starting timing after the first SSID is sent out; and
stopping sending out the first SSID when a timing duration reaches a preset duration and the wireless network information is not received.

3. The method according to claim 1, wherein the preset operation further includes:
after the image forming apparatus establishes the keyless communication connection with the electronic device, determining whether the electronic device is an authorized electronic device; and
if the electronic device is not the authorized electronic device, disconnecting the keyless communication connection established between the image forming apparatus and the electronic device, or stopping exchanging information with the electronic device, or not executing an instruction sent by the electronic device.

4. The method according to claim 1, wherein the preset operation further includes:
after the image forming apparatus establishes the keyless communication connection with the electronic device, determining whether an operation instruction sent by the electronic device is received; and
if the operation instruction is received, discarding the operation instruction or not executing the operation instruction.

5. The method according to claim 1, wherein before sending out the first SSID without the corresponding encryption key, the method further includes:
establishing a communication connection with the electronic device by sending out the second SSID or via a USB interface, such that the electronic device is capable of sending a trigger instruction to the image forming apparatus, or generating a trigger instruction in response to a user operation through a control panel of the image forming apparatus; and
acquiring the trigger instruction, such that the image forming apparatus is capable of sending out the first SSID without the corresponding encryption key based on the trigger instruction.

6. The method according to claim 1, wherein:
after the image forming apparatus establishes the keyless communication connection with the electronic device, the electronic device is only used for performing network configurations, or
after the image forming apparatus establishes the keyless communication connection with the electronic device, the electronic device is restricted to using partial functions of the image forming apparatus.

7. An image forming apparatus, comprising:
a memory, for storing computer-executable instructions; and
at least one processor, coupled with the memory and configured, when the computer-executable instructions being executed, to perform a network connection configuration method, the network connection configuration method comprising:
sending out a first service set identifier (SSID) without a corresponding encryption key, such that an electronic device which receives the first SSID is capable of establishing a keyless communication connection with the image forming apparatus based on the first SSID;

executing a preset operation, wherein the preset operation includes acquiring wireless network information sent by the electronic device which establishes the keyless communication connection with the image forming apparatus, and establishing a communication connection with a corresponding wireless network device based on the wireless network information, wherein after establishing the communication connection with the corresponding wireless network device, the keyless communication connection with the electronic device is disconnected; and
sending out a second SSID with a corresponding encryption key, such that the electronic device which receives the second SSID is capable of establishing a key communication connection with the image forming apparatus based on the second SSID and the corresponding encryption key.

8. The apparatus according to claim 7, wherein the preset operation further includes:
starting timing after the first SSID is sent out; and
stopping sending out the first SSID when a timing duration reaches a preset duration and the wireless network information is not received.

9. The apparatus according to claim 7, wherein the preset operation further includes:
after the image forming apparatus establishes the keyless communication connection with the electronic device, determining whether the electronic device is an authorized electronic device; and
if the electronic device is not the authorized electronic device, disconnecting the keyless communication connection established between the image forming apparatus and the electronic device, or stopping exchanging information with the electronic device, or not executing an instruction sent by the electronic device.

10. The apparatus according to claim 7, wherein the preset operation further includes:
after the image forming apparatus establishes the keyless communication connection with the electronic device, determining whether an operation instruction sent by the electronic device is received; and
if the operation instruction is received, discarding the operation instruction or not executing the operation instruction.

11. The apparatus according to claim 7, wherein before sending out the first SSID without the corresponding encryption key, the method further includes:
establishing a communication connection with the electronic device by sending out the second SSID or via a USB interface, such that the electronic device is capable of sending a trigger instruction to the image forming apparatus, or generating a trigger instruction in response to a user operation through a control panel of the image forming apparatus; and
acquiring the trigger instruction, such that the image forming apparatus is capable of sending out the first SSID without the corresponding encryption key based on the trigger instruction.

12. The apparatus according to claim 7, wherein:
after the image forming apparatus establishes the keyless communication connection with the electronic device, the electronic device is only used for performing network configurations, or
after the image forming apparatus establishes the keyless communication connection with the electronic device, the electronic device is restricted to using partial functions of the image forming apparatus.

13. A non-transitory computer-readable storage medium, containing program instructions for, when being executed by a processor, performing a network connection configuration method, the network connection configuration method comprising:
- sending out a first service set identifier (SSID) without a corresponding encryption key, such that an electronic device which receives the first SSID is capable of establishing a keyless communication connection with the image forming apparatus based on the first SSID;
- executing a preset operation, wherein the preset operation includes acquiring wireless network information sent by the electronic device which establishes the keyless communication connection with the image forming apparatus, and establishing a communication connection with a corresponding wireless network device based on the wireless network information, wherein after establishing the communication connection with the corresponding wireless network device, the keyless communication connection with the electronic device is disconnected; and
- sending out a second SSID with a corresponding encryption key, such that the electronic device which receives the second SSID is capable of establishing a key communication connection with the image forming apparatus based on the second SSID and the corresponding encryption key.

14. The storage medium according to claim 13, wherein the preset operation further includes:
- starting timing after the first SSID is sent out; and
- stopping sending out the first SSID when a timing duration reaches a preset duration and the wireless network information is not received.

15. The storage medium according to claim 13, wherein the preset operation further includes:
- after the image forming apparatus establishes the keyless communication connection with the electronic device, determining whether the electronic device is an authorized electronic device; and
- if the electronic device is not the authorized electronic device, disconnecting the keyless communication connection established between the image forming apparatus and the electronic device, or stopping exchanging information with the electronic device, or not executing an instruction sent by the electronic device.

16. The storage medium according to claim 13, wherein the preset operation further includes:
- after the image forming apparatus establishes the keyless communication connection with the electronic device, determining whether an operation instruction sent by the electronic device is received; and
- if the operation instruction is received, discarding the operation instruction or not executing the operation instruction.

17. The storage medium according to claim 13, wherein before sending out the first SSID without the corresponding encryption key, the method further includes:
- establishing a communication connection with the electronic device by sending out the second SSID or via a USB interface, such that the electronic device is capable of sending a trigger instruction to the image forming apparatus, or generating a trigger instruction in response to a user operation through a control panel of the image forming apparatus; and
- acquiring the trigger instruction, such that the image forming apparatus is capable of sending out the first SSID without the corresponding encryption key based on the trigger instruction.

18. The storage medium according to claim 13, wherein:
- after the image forming apparatus establishes the keyless communication connection with the electronic device, the electronic device is only used for performing network configurations, or
- after the image forming apparatus establishes the keyless communication connection with the electronic device, the electronic device is restricted to using partial functions of the image forming apparatus.

* * * * *